(12) United States Patent
Bogacki et al.

(10) Patent No.: US 11,715,222 B1
(45) Date of Patent: Aug. 1, 2023

(54) QUASI-ROTATION-INVARIANT SHAPE DESCRIPTOR

(71) Applicant: APTIV TECHNOLOGIES LIMITED, St. Michael (BB)

(72) Inventors: Piotr Bogacki, Cracow (PL); Rafal Dlugosz, Lubon (PL); Marzena Banach, Puszczykowo (PL)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 18/083,123

(22) Filed: Dec. 16, 2022

(51) Int. Cl.
 *G06T 7/521* (2017.01)
 *G06T 7/13* (2017.01)
 *G06T 7/70* (2017.01)
 *G06T 7/20* (2017.01)
 *G06T 3/60* (2006.01)

(52) U.S. Cl.
 CPC .............. *G06T 7/521* (2017.01); *G06T 3/60* (2013.01); *G06T 7/13* (2017.01); *G06T 7/20* (2013.01); *G06T 7/70* (2017.01); *G06T 2207/10028* (2013.01); *G06T 2207/30252* (2013.01)

(58) Field of Classification Search
 CPC .. G06T 7/521; G06T 7/13; G06T 7/70; G06T 7/20; G06T 3/60; G06T 2207/10028; G06T 2207/30252
 See application file for complete search history.

(56) References Cited

U.S. PATENT DOCUMENTS

| 10,451,405 | B2 * | 10/2019 | Clayton | G06T 7/292 |
| 10,776,953 | B2   | 9/2020  | Dworakowski et al. | |
| 11,100,335 | B2 * | 8/2021  | Winter | G06F 18/21355 |
| 11,562,575 | B2 * | 1/2023  | Bogacki | G06V 20/582 |
| 2016/0117795 | A1 * | 4/2016 | Chang | G06T 15/00 345/419 |
| 2016/0154999 | A1   | 6/2016  | Fan et al. | |
| 2019/0205630 | A1 * | 7/2019  | Kusens | A61B 5/6891 |

(Continued)

FOREIGN PATENT DOCUMENTS

| EP | 3872693 A1 | 9/2021 | |
| WO | WO-2010130245 A1 * | 11/2010 | G06K 9/00355 |

OTHER PUBLICATIONS

Extended European Search Report issued by the European Patent Office in connection with International Application No. 21216907.2, dated Jun. 27, 2022.

(Continued)

*Primary Examiner* — Shefali D Goradia
(74) *Attorney, Agent, or Firm* — Carter, DeLuca & Farell LLP; George Likourezos

(57) ABSTRACT

One aspect relates to a computer-implemented method for determining a quasi-rotation-invariant shape descriptor of point cloud data in an automotive system for monitoring the environment of a vehicle. In order to determine the shape descriptor, a method of determining a central point of a point cloud data is performed multiple times, each time using different values for one or more starting parameters. The method may yield different central points depending on the selected values for the one or more starting parameters. A regression line is calculated for the plurality of central points such that the shape descriptor is determined based on a base form of the plurality of central points.

15 Claims, 12 Drawing Sheets

(56) References Cited

U.S. PATENT DOCUMENTS

2020/0218276 A1* 7/2020 Lee ................... G05D 1/0257

OTHER PUBLICATIONS

Laetitia Gond, et al., "A regression-based approach to recover human pose from voxel data", 2009 IEEE 12th International Conference on Computer Vision Workshops, pp. 1012-1019, Sep. 27, 2009.

Amina Gahramanova, "Locating Centers of Mass with Image Processing", Undergraduate Journal of Mathematical Modeling: One + Two: vol. 10, Issue 1, Article 1, 2019.

T. Y. Zhang, et al., "A Fast Parallel Algorithm for Thinning Digital Patterns", Communications of the ACM, vol. 27, No. 3, Mar. 1984.

Yukang Wang, et al., "DeepFlux for Skeletons in the Wild", Computer Vision and Pattern Recognition (CVPR), 10.1109/CVPR. 2019.00543, pp. 1-10, Nov. 30, 2018.

Timo Ojala, et al., "Multiresolution Gray Scale and Rotation Invariant Texture Classification with Local Binary Patterns", IEEE Transactions on pattern analysis and machine intelligence 24.7: 971-987, 2002.

David G. Lowe, "Object Recognition from Local Scale-Invariant Features", Proceedings of the International Conference on Computer Vision, 2, pp. 1150-1157, Sep. 1999.

Herbert Bay, et al., "SURF: Speeded Up Robust Features", Computer Vision and Image Understanding (CVIU), vol. 110, No. 3, pp. 346-359, 2008.

P. F. Alcantarilla, et al., "Automatic LightBeam Controller for driver assistance", Machine Vision and Applications, vol. 22, pp. 819-835, Sep. 2011.

Chang Liu, et al., "Adaptive Linear Span Network for Object Skeleton Detection", IEEE Transactions on Image Processing, vol. 30, pp. 1-13, May 2021.

V. Agafonkin, "A new algorithm for finding a visual center of a polygon" [Blog post], retrieved from: https://blog.mapbox.com/a-new-algorithm-for-finding-a-visual-center-of-a-polygon-7c77e6492fbc, pp. 1-7, 2016.

N. Dalal, et al., "Object Detection using Histograms of Oriented Gradients", Pascal VOC Workshop, ECCV, pp. 1-20, May 7, 2006.

A. Lopez, et al., "Nighttime Vehicle Detection for Intelligent Headlight Control", 10th International Conference on Advanced Concepts for Intelligent Vision Systems, pp. 113-124, 2008.

T.C. Lee, et al., "Building Skeleton Models via 3-D Medial Surface/Axis Thinning Algorithms", Computer Vision, Graphics, and Image Processing, 56(6):462-478, 1994.

Y.L. Chen, "Nighttime Vehicle Light Detection on a Moving Vehicle using Image Segmentation and Analysis Techniques", WSEAS Transactions on Computers, vol. 8, pp. 1-10, Mar. 2009.

\* cited by examiner

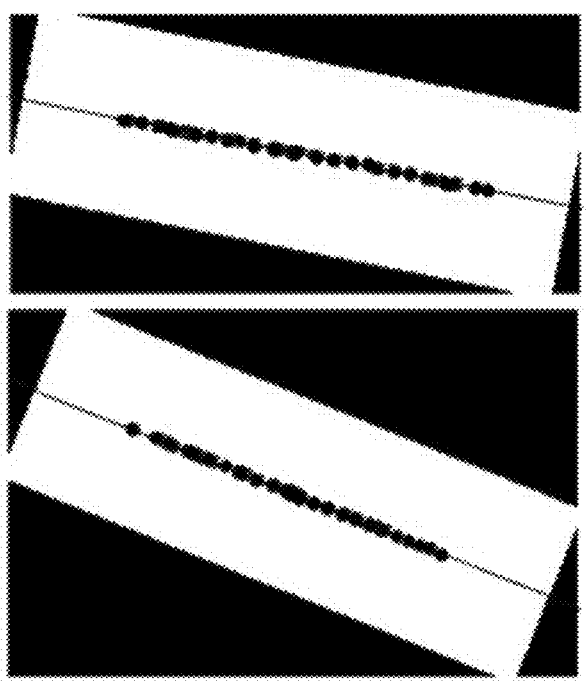
Fig. 10a
Fig. 10b
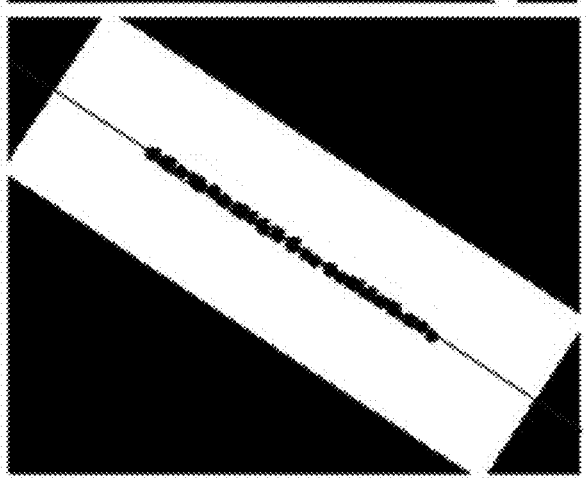
Fig. 10c
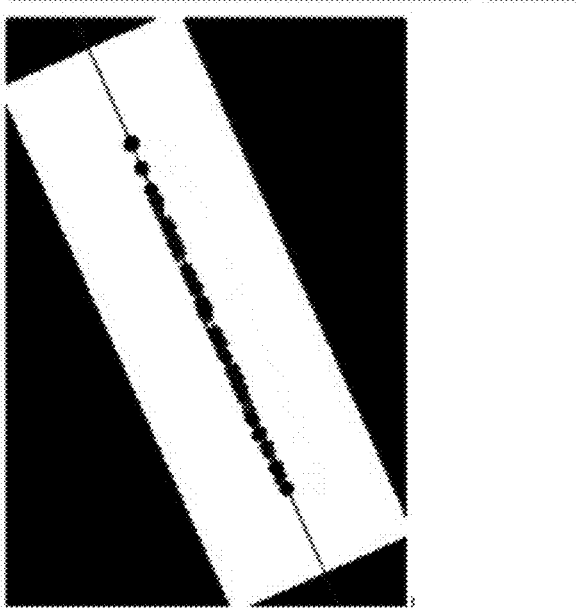
Fig. 10d

QUASI-ROTATION-INVARIANT SHAPE DESCRIPTOR

CROSS-REFERENCE TO RELATED APPLICATION

This application claims the benefit of European patent application serial number EP 21216907.2 filed on Dec. 22, 2021. The entire contents of which are hereby incorporated by reference herein.

TECHNICAL FIELD

The present invention relates to a method and apparatus for determining a quasi-rotation-invariant shape descriptor of point cloud data in an automotive system for monitoring the environment of a vehicle.

BACKGROUND

In the field of imaging systems and computer vision techniques, a need exists for a method that enables computing, in a simple way, the position of a central point of point cloud data located in an n-dimensional space. The term "point cloud data" (also called object) is here understood as a collection of points that are sufficiently close to other points from a given collection, so that the object collection can be distinguished from other similar objects in the data space.

The position of the central point of point cloud data may depend on the details of the method used. The method may yield different results based on, for example, the value(s) of one or more starting parameters. This way the method of determining the central point can be repeated to determine a plurality of central points. A plurality of central points of a point cloud can also be interpreted as a skeleton of the point cloud.

The skeleton of point cloud data may provide a basis for computing descriptive variables indicative of a target represented by the point cloud data. It is a desired feature of such an descriptive variable to be invariant under rotations of the point cloud data, that is, point cloud data representing the same target but with different orientations (rotations) of the target with respect to the imaging sensors should result in similar values of the descriptive variable.

In the literature one can find various methods that allow for computing the position of the central point of an object. In most of the reported cases these methods are used to find the central point of light spots in a 2-dimensional data space. The central point can be defined in various ways, depending on the application requirements. In majority of cases, the used algorithms compute the, so called, center of gravity of point cloud data.

Reference [1] describes a method for locating the centroid of planar objects, that is, their center of gravity, of different shapes using computer vision techniques to scan through images depicting different objects and locate their centroids. In such an approach, the overall area of the object is taken into account, while computing the position of its central point. As a result, if for example two or more smaller objects are joined together with a "bridge", the center of gravity is located somewhere in-between these smaller objects. In a similar way, if an undesired object ("stuck-on" part) is glued with an object of interest, the center of gravity is shifted from the position, in which it would be in case of the lack of the undesired segment of the object.

Reference [2] describes an algorithm that may be useful for placing labels and tooltips on polygons by finding a polygon pole of inaccessibility, which is the most distant internal point from the polygon outline. However, this method is known to be computationally complex and as such is not recommended for real time applications. In this case even several hundred temporary points are selected, covering the spot that is processed. For each point, distances to particular segments of the boundary are computed that requires using a large number of trigonometric operations.

Reference [3] describes an algorithm for computing a feature used to describe, in a simple way, a shape of an object. The position of the central point of this object has to be determined before starting the procedure described in Reference [3]. This feature is then used in the classification process of the objects, performed with the use of artificial neural networks. In such applications, the required precision of the computation of the position of the central point of the spot does not need to be very high.

Patent Literature [4] describes a method for identifying candidate points as possible characteristic points of a calibration pattern within an image of the calibration pattern.

References [5] through [8] provide examples for determining the skeleton of figures, wherein the approaches described in References [5] and [6] are based on conventional image processing techniques, while References [7] and [8] employ artificial neural networks (ANN). The problem is that all these methods are computationally complex.

The method of Reference [5] works by making successive passes of the image, removing pixels on object borders. This continues until no more pixels can be removed. The image is correlated with a mask that assigns each pixel a number in the range 0 to 255 corresponding to each possible pattern of its 8 neighboring pixels. A look up table is then used to assign the pixels a value of 0, 1, 2 or 3, which are selectively removed during the iterations.

The algorithm described in Reference [6] uses an octree data structure to examine a 3×3×3 neighborhood of a pixel. The algorithm proceeds by iteratively sweeping over the image and removing pixels at each iteration until the image stops changing. Each iteration consists of two steps: first, a list of candidates for removal is assembled; then pixels from this list are rechecked sequentially, to better preserve connectivity of the image.

In state-of-the art literature, various image descriptors are proposed in order to extract specific features of the particular 2-dimensional objects: Reference [9] describes histograms of oriented gradients, Reference [10] describes local binary patterns, Reference [11] describes scale-invariant features, Reference [12] describes speed-up-robust features, Reference [13] describes intensity features, Reference [14] describes color information and Reference [15] describes blob locations.

REFERENCES

[1]: Gahramanova, Amina (2019) "Locating Centers of Mass with Image Processing", Undergraduate Journal of Mathematical Modeling: One+Two: Vol. 10: Iss. 1, Article 1, DOI: https://doi.org/10.5038/2326-3652.10.1.4906
[2]: Vladimir Agafonkin (2016) "A new algorithm for finding a visual center of a polygon" [Blog post], retrieved from: https://blog.mapbox.com/a-new-algorithm-for-finding-a-visual-center-of-a-polygon-7c77e6492fbc
[3]: EP 3 872 693 A1
[4]: U.S. Pat. No. 10,776,953 B2

[5]: T. Y. Zhang and C. Y. Suen (March 1984) "A fast parallel algorithm for thinning digital patterns", Communications of the ACM, Volume 27, Number 3

[6]: T.-C. Lee, R. L. Kashyap and C.-N. Chu (1994) "Building skeleton models via 3-D medial surface/axis thinning algorithms", Computer Vision, Graphics, and Image Processing, 56(6):462-478

[7]: Yukang Wang, Yongchao Xu, Stavros Tsogkas, Xiang Bai, Sven Dickinson, Kaleem Siddiqi (2019) "DeepFlux for Skeletons in the Wild", Computer Vision and Pattern Recognition (CVPR), 10.1109/CVPR.2019.00543

[8]: Chang Liu, Yunjie Tian, Jianbin Jiao, Qixiang Ye (May 2021) "Adaptive Linear Span Network for Object Skeleton Detection", IEEE Transactions on Image Processing, Vol. 30, pp. 5096-5108

[9]: Dalal, N., Triggs, B. (2006) "Object Detection using Histograms of Oriented Gradients", In: Pascal VOC Workshop, ECCV

[10]: Ojala, Timo, Matti Pietikainen, and Topi Maenpaa (2002) "Multiresolution gray-scale and rotation invariant texture classification with local binary patterns", IEEE Transactions on pattern analysis and machine intelligence 24.7: 971-987

[11]: Lowe, David G. (1999) "Object recognition from local scale-invariant features", Proceedings of the International Conference on Computer Vision, 2, pp. 1150-1157

[12]: Herbert Bay, Andreas Ess, Tinne Tuytelaars, Luc Van Gool (2008) "SURF: Speeded Up Robust Features", Computer Vision and Image Understanding (CVIU), Vol. 110, No. 3, pp. 346-359

[13]: P. F. Alcantarilla, L. M. Bergasa, et al. (September 2011) "Automatic LightBeam Controller for driver assistance", Machine Vision and Applications, vol. 22, pp. 819-835

[14]: A. Lopez, J. Hilgenstock, et al. (2008) "Nighttime vehicle detection for intelligent headlight control", 10th International Conference on Advanced Concepts for Intelligent Vision Systems, pp. 113-124

[15]: Y. L. Chen (March 2009) "Nighttime vehicle light detection on a moving vehicle using image segmentation and analysis techniques", WSEAS Transactions on Computers, vol. 8, pp. 506-515

SUMMARY OF THE INVENTION

In the novel approach proposed in the present disclosure, a quasi-rotation-invariant shape descriptor of point cloud data comprising a plurality of central points of point cloud data is determined. The quasi-rotation-invariant shape descriptor may be used to describe the shape of an unknown target represented by the point cloud data. The term "point cloud data" (also called object) is here understood as a point cloud data, that is, a collection of points that are sufficiently close to other points from the collection, so that the point cloud data can be distinguished from any other point cloud data in the data space. The plurality of central points of the point cloud data, determined in the proposed method, is included in the so-called skeleton of the point cloud data.

The proposed quasi-rotation-invariant shape descriptor offers a much simpler description of the point cloud data compared to the state-of-the-art solutions presented above. It returns only three numeric values. One of them is an inclination angle that indicates the rotation of the point cloud data. Based on this angle the object is rotated to its "base" version, for which horizontal and vertical stretch (or compression) parameters are then computed. The latter two values are sufficient to determine whether the point cloud data has simple (regular) or more sophisticated (irregular) shape.

In the proposed method of determining a central point of point cloud data, the central point is, to some extent, understood as in Reference [2]. However, in contrary to Reference [2], it is assumed that the boundaries of the point cloud data may be irregular, which is important from the point of view of target applications in automotive systems. Thus, it is an aim of the proposed method to find a quasi-rotation-invariant shape descriptor of point cloud data regardless of the shape and rotation of the point cloud data. In the following, the proposed quasi-rotation-invariant shape descriptor may, for the sake of brevity, simply referred to as the shape descriptor.

It is yet another aim of the proposed method to provide an algorithm with substantially reduced computational complexity compared to the state of the art. This is particularly important for real-time applications in a vehicle.

To achieve or at least partially achieve the above-mentioned aims, apparatuses and methods according to the invention are defined in the independent claims. Particular embodiments are defined in the dependent claims, and are explained in the present description.

One aspect relates to a computer-implemented method for determining a shape descriptor of point cloud data in an automotive system for monitoring the environment of a vehicle. The shape descriptor is indicative of the shape of the point cloud data. The point cloud data is generated by one or more sensors of the vehicle with respect to a reference coordinate system. The point cloud data defines a connected subspace of the reference coordinate system. The method comprises the steps of a) determining a bounding box of the point cloud data, b) selecting a plurality of starting agent positions of an agent within the bounding box, and c) selecting a plurality of coordinate systems relative to the bounding box. The method further comprises a step d) of performing, for one of the selected plurality of starting agent positions and one of the selected plurality of coordinate systems, a plurality of agent moving operations. Each agent moving operation comprises moving the agent from the current agent position to a new agent position parallel to a coordinate axis of the selected coordinate system. The new agent position is determined based on an intersecting line through the current agent position parallel to the coordinate axis. The method further comprises a step e) of determining, after step d) is completed, the new agent position as a central point of the point cloud data. The method further comprises a step f) of repeating steps d) and e) for each combination of the plurality of staring agent positions and the plurality of coordinate systems, thereby determining a plurality of central points of the point cloud data. The method further comprises a step g) of determining a regression line by calculating a linear regression for the plurality of central points. The method further comprises a step h) of performing one of the following steps h1) and h2): h1) rotating the plurality of central points to a base form such that the regression line corresponds to a predetermined direction; or h2) rotating the point cloud data to a base form such that the regression line corresponds to a predetermined direction, and repeating steps a) to f) for the base form to obtain a plurality of central points of the base form. The method further comprises a step i) of computing the shape descriptor based on the plurality of central points of the base form, wherein the shape descriptor comprises the one or more inclination angles and information indicative of the stretch and compression of the base form of the point cloud data with respect to one or more axis of the reference coordinate system.

Thus, in order to determine the shape descriptor, a method of determining a central point of a point cloud data is performed multiple times, each time using different values for one or more starting parameters. The method may yield different central points depending on the selected values for the one or more starting parameters. The resulting plurality of central points is used to compute the shape descriptor.

In contrast to the state-of-the art solutions described above, the proposed method is substantially less computationally complex. Additionally, it can be used iteratively, so its computational complexity can be adapted to a specific application. The problem may be, for example, to search for point cloud data with regular shapes (e.g. light sources), while rejecting those that exhibit irregularities (e.g. concave shapes). In this case, after only a few repetitions of the method for determining a central point of point cloud data, it is possible to get an information about distribution in the resulting plurality of central points and not continue the iterative process. The measure of aggregation of the set is here an indicator of the regularity of the processed object.

In another aspect, the plurality of starting agent positions is selected at random positions within the bounding box or at predetermined positions within the bounding box.

In another aspect, the information indicative of the stretch and compression of the base form is given by at least one of a standard deviation, variance, skewness and mean value.

In another aspect, the reference coordinate system and the coordinate systems relative to the bounding box are orthogonal.

In another aspect, the reference coordinate system and the coordinate systems relative to the bounding box are 2-dimensional, and step c) comprises selecting rotation angles defining the rotation of the reference coordinate system with respect to a coordinate system.

In another aspect, the new agent position is determined based on edge points given by the intersections of an intersecting line through the current agent position parallel to the coordinate axis with the boundary of the subspace defined by the point cloud data In another aspect, the new agent position is determined based on a first and a second edge point of edge points given by the intersections of an intersecting line through the current agent position parallel to the coordinate axis with the boundary of the subspace defined by the point cloud data, wherein the first and second edge points are determined as the edge points of a connected line segment of a plurality of connected line segments closest to the current agent position, or the first and second edge points are determined as the edge points of the largest connected line segment of a plurality of connected line segments, wherein each connected segment of the plurality of connected line segments is defined as a range where the intersecting line intersects the connected subspace.

In another aspect, the new agent position is determined as the center point of the first and second edge point.

In another aspect, the new agent position is determined based on adding the difference between a first number and a second number, divided by a positive real-valued constant, to the current agent position with respect to the coordinate axis, wherein the first number is a number of data points of the point cloud data in a first direction along the intersecting line and the second number is a number of data points of the point cloud data in a second direction along the intersecting line.

In another aspect, the selected coordinate system is N-dimensional with coordinate axes x1, ..., xN and step d) comprises moving the agent, for i=1, ..., N, from the current agent position to the new agent position in the positive or negative direction of the coordinate axis $x_1$.

In another aspect, the number of agent moving operations is predetermined, or step d) is completed if the distance between the current agent position and the new agent position is smaller than a threshold distance.

In another aspect, the method further comprises the steps of classifying the shape of the point cloud data as regular based on the shape descriptor.

In another aspect, the one or more sensors of the vehicle comprise cameras, photosensors, infrared sensors, lidar sensors, radar sensors and/or ultrasonic sensors.

In another aspect, the method further comprises the step of executing, after step i), a predetermined operation of the vehicle based on the determined shape descriptor of the point cloud data, wherein the predetermined operation comprises adaptive headlight control, traffic sign recognition, automatic emergency breaking and/or object tracking.

In another aspect, the present disclosure relates to a data processing apparatus comprising means for carrying out the steps of the method of any one of the previous aspects.

In another aspect, the present disclosure relates to a vehicle comprising the data processing apparatus.

BRIEF DESCRIPTION OF THE DRAWINGS

FIG. 1b shows two separate images, each representing the point cloud data associated with one of the headlights in FIG. 1a.

FIGS. 10a to 10d illustrates point cloud data with a rectangular shape and inclination angles of 11°, 22°, 33° and 66°, respectively.

DETAILED DESCRIPTION

Figure 1A:
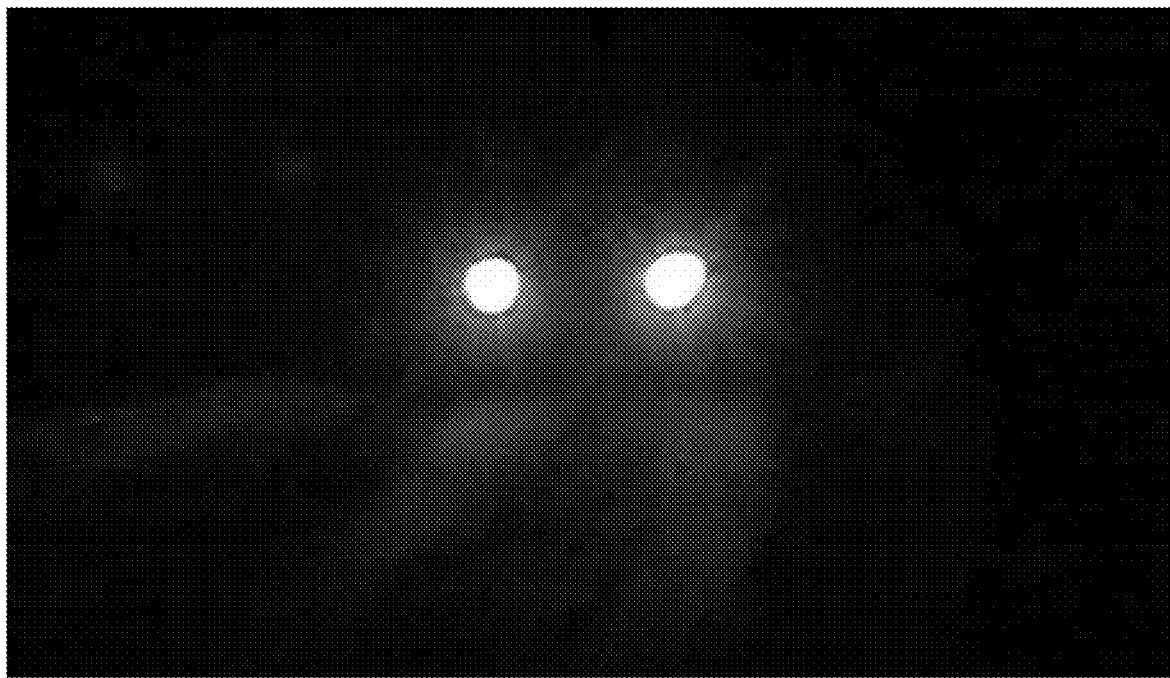
FIG. 1a is an example of an image of photosensor data showing two bright spots representing the glowing headlights of a car.

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive.

A point cloud data of a target may be based on data generated using one or more sensors, such as digital imaging sensors with rows and columns of pixels. For example, imaging sensor may comprise cameras, photosensors, infrared sensors, lidar sensors, radar sensor, ultrasonic sensors and the like. The one or more sensor generating the point cloud data may be part of a vehicle and may for example provide information related to the surrounding environment of the vehicle. Similarly, the one or more sensor may provide information related to the interior of the vehicle. The target refers to a target in the real world whose center point is to be determined in order to track/monitor the target. The target may for example be the headlights of a car.

The point cloud data may represent information about the target and may for example be used in a subsequent data analysis method, such as target recognition methods or target tracking methods. Target recognition methods may be used to determine the class or type of a target represented by the point cloud data. Target tracking methods may be used to track the time-evolution of a target represented by the point cloud data comprising two or more point clouds representing the target at different times, thereby providing information related to the target's trajectory, direction of motion, velocity, acceleration and/or the like.

The point cloud data is given with respect to a reference coordinate system. The reference coordinate system may be a spatial coordinate system, wherein each axis represents a spatial direction. The reference coordinate system may for example be 2-dimensional, 3-dimensional or higher dimensional. The reference coordinate system may be orthogonal.

An example for a 2-dimensional point cloud data of a target, that is, a point cloud data represented by a 2-dimensional reference coordinate system, is a point cloud data generated by a photosensor. The photosensors may for example provide, after pre-processing such as thresholding or binarization, a black-and-white image of a scene at a given time, wherein data points, such as white pixels, correspond to a light source or a reflection of a light source and no data points, such as black pixels, corresponds to the absence of light. For example, the reference coordinate system is defined with its axes aligned along the edges of the image, i.e. the x-axis is aligned along the horizontal edge of the image, while the y-axis is aligned along the vertical edge.

An example of a 3-dimension point cloud data, that is, a point cloud data represented by a 3-dimensional reference coordinate system, is a point cloud data generated by a lidar system, such as a scanning lidar system or flash lidar system. The target may for example be illuminated by one or more pulses of laser light generated by the lidar system and the laser light reflected by the target is received by a laser light sensor of the lidar system, wherein the laser light sensor provides spatial and timing information. The timing information may be used to determine the range between the lidar system and the target, thereby providing 3-dimensional point cloud data.

The reference coordinate system could also be 4-dimensional by adding a time axis to 3-dimensional data. Furthermore, an even higher dimensional reference coordinate system could be used by merging data from multiple sensors.

The point cloud data may preferably be digitized, meaning that the data points in the reference coordinate system take discrete values. For example, the reference coordinate system may be adapted to the structure of the one or more digital imaging sensors, each having rows and columns of pixels. In this case, each cell of the discrete reference coordinate system may correspond to a pixel or a read-out time interval of the one or more sensors.

The point cloud data of the target may be based on data generated by the one or more sensors which has been pre-processed according to the requirements of a subsequent data analysis method. For example, the point cloud data may be based on sensor data which has been filtered, scaled, binarized with respect to a predetermined threshold value, and/or has otherwise been transformed.

The one or more sensors may provide information (sensor data) related to a plurality of targets and/or to a plurality of features of a single target. In this case, the information may yield a plurality of point cloud data, wherein each of the plurality of point cloud data represents a target of the plurality of targets and/or a feature of the plurality of features of a single target.

The point cloud data defines a connected subspace of the reference coordinate system. The connected subspace is constituted by the plurality of data points of the point cloud data, wherein each data point in the plurality of data points is located adjacent to another data point of the plurality of data points. In other words, a data point is said to be adjacent if it is sufficiently close, i.e. within a certain range, to another data point of the same plurality of data points, so that the plurality of data points can be distinguished from another plurality of data points. For example, in a discrete reference coordinate system, for each data point of the plurality of data points there is another data point in an adjacent cell.

FIG. 1a is an example of an image of photosensor data showing two bright spots representing the glowing headlights of a car in a dark environment. In this case, the reference coordinate system 1 is 2-dimensional.

Figure 1B:
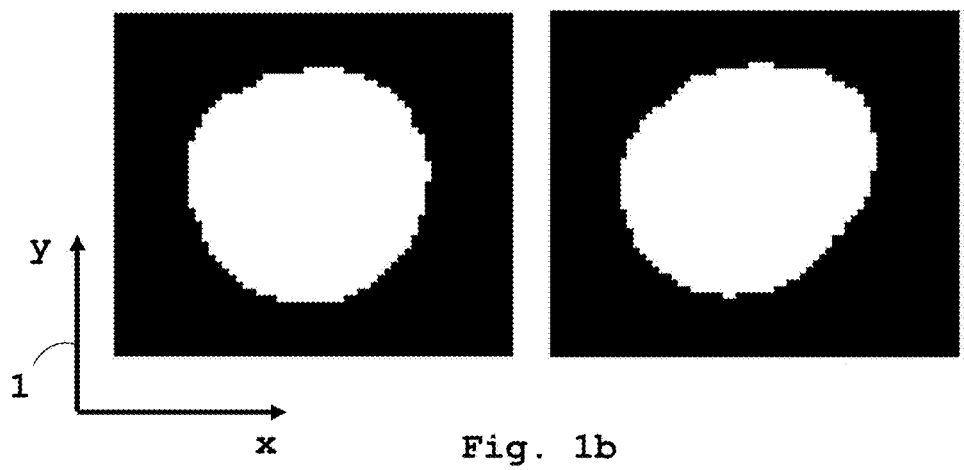

FIG. 1b shows two separate images, each representing point cloud data 2 associated with (corresponding to) one of the headlights. In this example, the point cloud data 2 corresponds to a binarized version of the two bright spots shown in FIG. 1a. The binarization of the photosensor data may be performed using a predetermined threshold, such that a data point of the photosensor data with a value larger than the predetermined threshold is assigned to the point cloud data 2, while a value lower or equal to the predetermined threshold is not.

In case of point cloud data (target) that has a regular shape, the center of gravity provides a good estimation of the position of the central point of the point cloud data. Several examples of such targets are shown in FIG. 1a. However, the computation complexity is in this case large, and additionally depends on the sizes (the number of pixels/points) inside the processed object. In case of objects that feature an irregular shape (see examples in FIGS. 4c and 4d), the center of gravity may be located far from the desired central point. Such a situation may happen for example in the AHC (adaptive headlight control) algorithm that aims at distinguishing the vehicle lights from other light sources. In numerous observed cases, the car lights are "glued", in the image taken by the camera, with other light spots, e.g. the lights of other vehicles, street lamps, etc. In this situation, due to unpredictable shapes of undesired objects glued with a target of interest, an erroneous description of the shape of this object may happen, which can lead to wrong classification of a given light.

The shape of the light spots in FIG. 1a is an indicator of real target captured in the image. For example, the car headlights most often have regular shapes, such as ovals or rectangles, or feature slight concavities due to noise or other smaller distortions. Additionally, the car lights in most cases are aligned horizontally. A different picture will be obtained, for example, for the road signs. Most European traffic signs have a circular red border around a light background. After a simple preprocessing, such traffic signs will provide point cloud data with a shape similar to a circle or to a ring. A pedestrian or a cyclist will create point cloud data with irregular shapes. Such point cloud data may further be classified with the use of artificial neural networks, for example, deep learning convolutional neural networks. A problem in this case is a large number of pixels in such point cloud data.

In the described situation, the ability to determine a simplified data set, which can be interpreted as the skeleton of point cloud data, may be useful for several reasons. On one hand, the computed skeleton allows for a substantial reduction of the amount of data to be processed during the subsequent classification of the target, e.g. using an artificial neural network. On the other hand, the obtained skeleton may, after some additionally processing, be used as supplementary data to assist in the classification or in the verification of the classification results.

In order to determine the skeleton, a method of determining a central point of a point cloud data is performed multiple times, each time using different value(s) for one or more starting parameters. In view thereof, it is an object of the proposed method of determining a central point of point cloud data to provide a fast and efficient method for determining a central point for each of the two bright spots in FIG. 1b.

Figure 2:
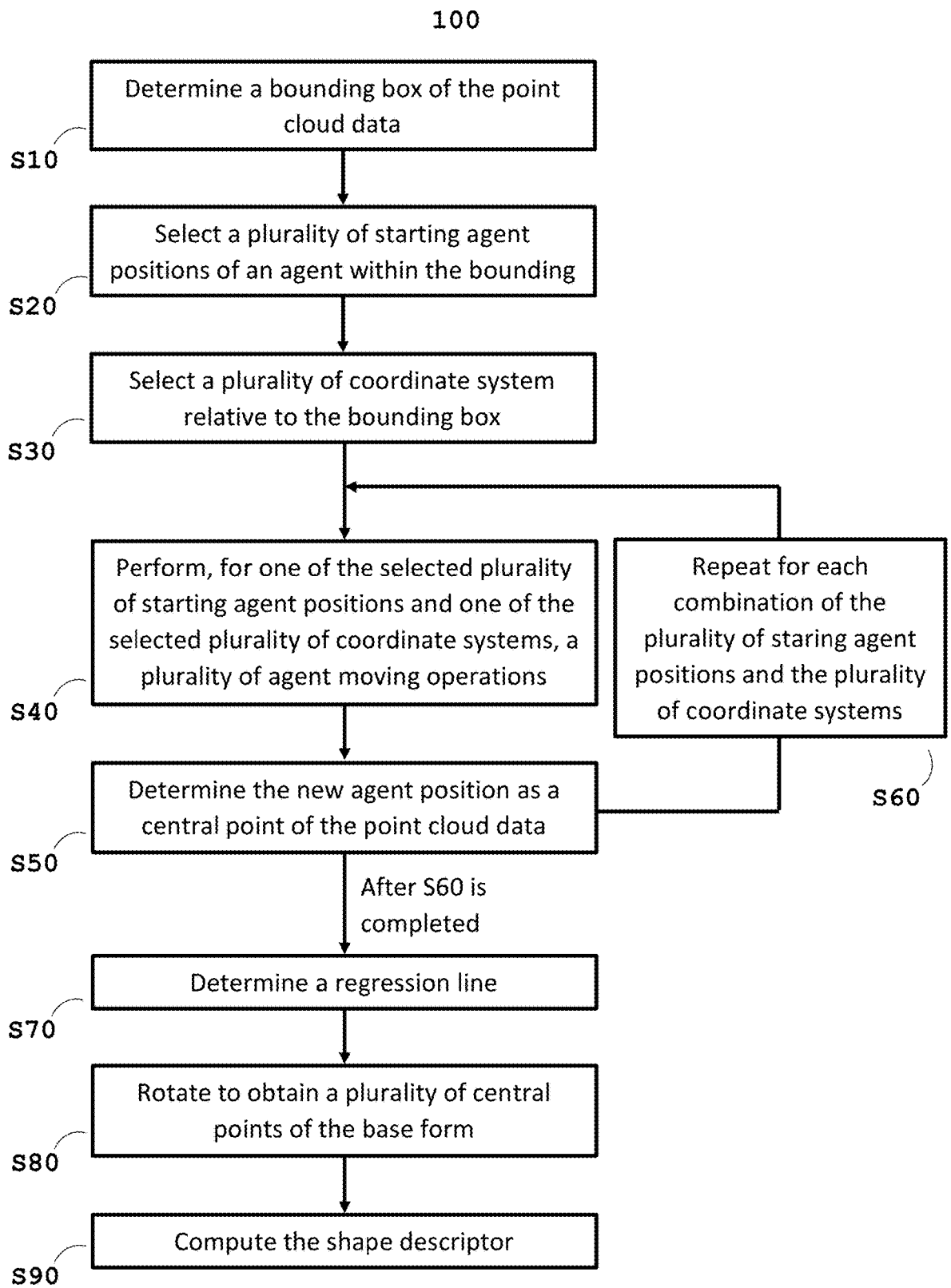
FIG. 2 is a flow chart of the method for determining a central point of point cloud data in an illustrative embodiment.

FIG. 2 is a flow chart of the method 100 for determining a plurality of central points of point cloud data in an illustrative embodiment. The method 100 will be described with respect to a point cloud data given by binarized photosensor data, although the method 100 may apply to other types of sensor data. The method 100 may include other steps, not shown, and the steps may be performed in a different order (especially, the order of steps S20 and S30 is arbitrary).

Figure 1C:
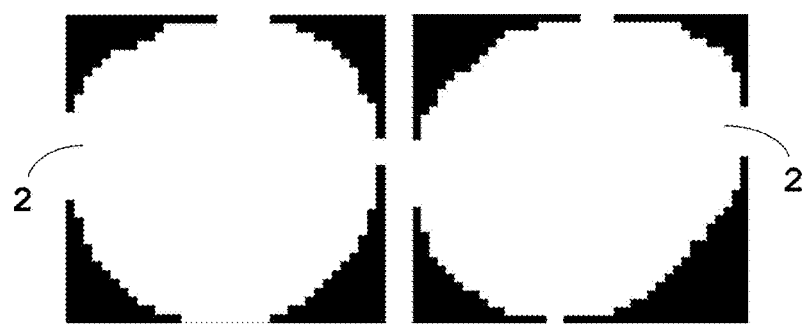
FIG. 1c shows an example of the point cloud data of FIG. 1b within a bounding box.

In a first step S10, a bounding box of the point cloud data 2 is determined, wherein each side of the bounding box is a tangent to the point cloud data 2. The bounding box may preferably have a rectangular shape since this simplifies the computations. FIG. 1c shows an example for each corresponding point cloud data 2 of FIG. 1b within a bounding box. For example, a standard image cropping algorithm may be used to determine the bounding box, wherein the image cropping algorithm removes unwanted peripheral areas of the images of FIG. 1b without data points while retaining a rectangular shape.

For convenience, the space within the bounding box may be parameterized using normalized coordinate values, that is, the reference coordinate system is adapted such that the reference coordinate system 1 is spanned by the edges of the bounding box intersecting at the origin of the reference coordinate system. In this case, points within the bounding box along each axis may have normalized coordinate values between 0 and 1 with respect to the given axis.

In a second step S20, a plurality of starting agent positions of an agent within the bounding box is selected. The agent serves as a point of reference for the following agent moving operations and its position is changed in each of the agent moving operations. Hence, the agent corresponds to one point in the reference coordinate system (or the coordinate system selected in the following step S30) within the bounding box. Each starting agent position of the plurality of starting agent positions may be selected at a different random position within the bounding box or at a different predetermined position within the bounding box. For example, a plurality of predetermined positions for the plurality of starting agent positions may be given by a set of equidistant points within the bounding box, such as points on a lattice, or a set of points with varying distances to one another.

In a third step S30, a plurality of coordinate systems relative to the bounding box is selected. Each coordinate system relative to the bounding box of the selected plurality of coordinate systems determines the allowable directions of movement of the agent in the agent moving operations. One or more (preferably all) of the selected plurality of coordinate systems may be orthogonal. The selected coordinate systems have the same dimension as the reference coordinate system. The selected coordinate systems may further be rotated against the reference coordinate system, that is, the third step may comprise selecting one or more rotation angles defining the rotation of the reference coordinate system with respect to each of the selected plurality of coordinate system. Furthermore, the origin of the reference coordinate system and the origin of one or more of the selected plurality of coordinate system may be identical.

The number of selected starting agent positions and the number of coordinate systems may be based on a complexity of the shape of the point cloud data. The complexity of the shape of the point cloud data may, for example, be based on the complexity of the shapes of previous point cloud data analyzed by the method 100. The complexity may also be based on the type of the sensor generating the information on which the point cloud data is based on. The complexity may correspond to a quality setting for controlling the granularity of the determined skeleton. The quality setting may be set by the driver or the vehicle manufacturer or the like. The quality setting may depend on external conditions such as the weather, time of day or the current amount of data generated by the sensors. Typically, the number of selected starting agent positions and the number of coordinate systems is in the order of 10.

In a fourth step S40, a plurality of agent moving operations are performed for one of the selected plurality of starting agent positions and one of the selected plurality of coordinate systems, wherein for each moving operation the agent is moved from the current agent position to a new agent position parallel to a coordinate axis of the selected coordinate system. In other words, the current agent position is given by the new agent position determined in the previous agent moving operation or, in case of the first agent move operation, by the starting agent position. The coordinate axis parallel to which the agent is moved may be changed after every agent moving operation of the plurality of agent moving operations. Preferably, the agent moves along all coordinate axes of the selected coordinate system in step S40.

The new agent position may be determined based on edge points given by the intersections of an intersecting line through the current agent position parallel to the coordinate axis with the boundary of the subspace defined by the point cloud data 2. The boundary of the point cloud data is not known in advance, but only determined along the intersecting line, such that the point cloud data does not need to be analyzed in advance to determine and store its boundary. This further reduces computational complexity.

The new agent position may be determined based on a first and a second edge point of the edge points and the new agent position may be determined as the center point of the first and second edge point. In other words, the new agent position is given by the midpoint of the line connecting first and second edge points, wherein the midpoint is determined by dividing the distance between the first and second edge point by a factor of two. In a computer implementation of the agent moving operation, a division by two may be performed by a bit shift operation that shifts a binary number one place to the right, wherein the lowest order bit is removed. For a computer, such an operation is therefore inexpensive, which contributes to the overall efficiency of the method 100.

The first and second edge points may be determined as the edge points of the largest connected line segment of a plurality of connected line segments, wherein each connected line segment of the plurality of connected line segments may be defined as a range where the intersecting line intersects the connected subspace. In this approach, the sum of data points for each of the plurality of connected line segments may be calculated.

Alternatively, the first and second edge points may be determined as the edge points of a connected line segment of a plurality of connected line segments closest to the current agent position, wherein each connected segment of the plurality of connected line segments is defined as a range where the intersecting line intersects the connected subspace.

Figure 3:
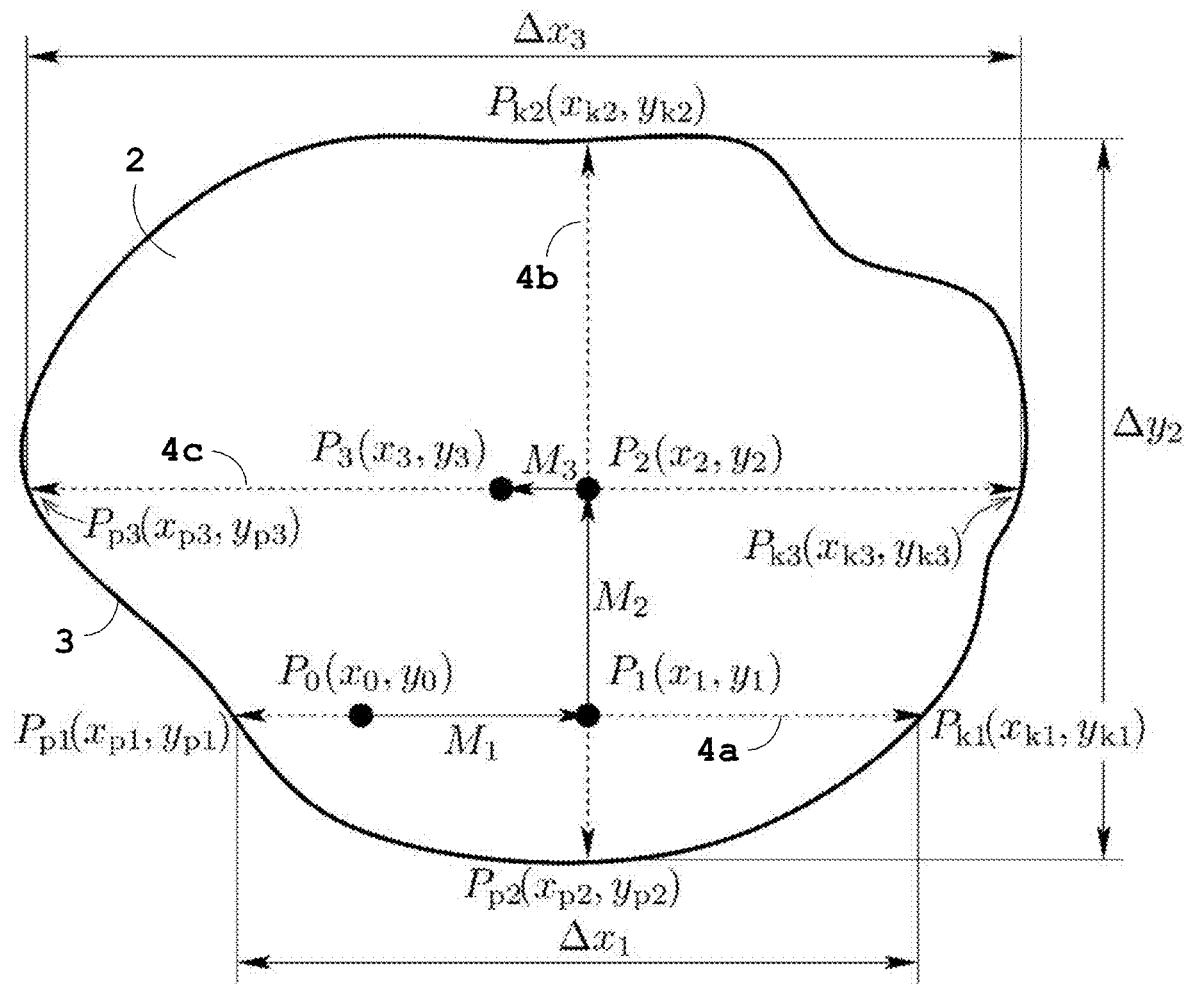
FIG. 3 shows an example for a plurality of agent moving operations for a 2-dimensional point cloud data.

FIG. 3 shows an example for a plurality of agent moving operations ($M_1$, $M_2$, $M_3$) for a 2-dimensional point cloud data 2 defining a connected subspace with an irregular boundary 3. The starting agent position is indicated with $P_0(x_0, y_0)$, wherein $x_0$ and $y_0$ are the coordinates of the starting agent position with respect to the selected coordinate system relative to the bounding box.

For the first agent moving operation $M_1$, a direction parallel to the x-axis of the selected coordinate system is chosen. The current agent position is $P_0(x_0, y_0)$. The first intersecting line 4a through $P_0(x_0, y_0)$ parallel to the x-axis intersects the boundary 3 at a first and second edge point, $P_{p1}(x_{p1}, y_{p1})$ and $P_{k1}(x_{k1}, y_{k1})$, respectively. The coordinates $x_1$ and $y_1$ of the new agent position $P_1(x_1, y_1)$ are then determined as the center point of the first and second edge point, such that $$x_1 = x_{p1} + (x_{k1} - x_{p1})/2 = x_{p1} + \Delta x_1/2,$$

$$y_1 = y_0.$$

This way the agent is moved from the current agent position $P_0(x_0, y_0)$ in the positive direction of the x-axis to the new agent position $P_1(x_1, y_1)$.

For the second agent moving operation ($M_2$) a direction parallel to the y-axis of the coordinate system relative to the bounding box is chosen. The current agent position is $P_1(x_1, y_1)$, i.e. the new agent position determined by the previous agent moving operation $M_1$. The second intersecting line 4b through $P_1(x_1, y_1)$ parallel to the y-axis intersects the boundary 3 at a first and second edge point, $P_{p2}(x_{p2}, y_{p2})$ and $P_{k2}(x_{k2}, y_{k2})$ respectively. The coordinates $x_2$ and $y_2$ of the new position $P_2(x_2, y_2)$ are then determined as the center point of the first and second edge point, such that $$x_2 = x_1,$$

$$y_2 = y_{p2}(y_{k2} - y_{p2})/2 = y_{p2} + \Delta y_2/2$$

This way the agent is moved from the current agent position $P_1(x_1, y_1)$ in the positive direction of the y-axis to the new agent position $P_2(x_2, y_2)$.

For the third agent moving operation $M_3$ a direction parallel to the x-axis of the coordinate system relative to the bounding box is chosen. The current agent position is $P_2(x_2, y_2)$, i.e. the new agent position determined by the previous agent moving operation $M_2$. The third intersecting line 4c through $P_2(x_2, y_2)$ parallel to the x-axis intersects the boundary 3 at a first and second edge point, $P_{p3}(x_{p3}, y_{p3})$ and $P_{k3}(x_{k3}, y_{k3})$, respectively. The coordinates $x_3$ and $y_3$ of the new agent position $P_3(x_3, y_3)$ are then determined as the center point of the first and second edge point, such that $$x_3 = x_{p3} + (x_{k3} - x_{p3})/2 = x_{p3} + \Delta x_3/2,$$

$$y_3 = y_2$$

This way the agent is moved from the current agent position $P_2(x_2, y_2)$ in the negative direction of the x-axis to the new agent position $P_3(x_3, y_3)$.

In the example shown in FIG. 3, the agent is allowed to move only within the point could data, i.e. once the agent enters the point could data, it cannot leave it. In this approach, the algorithm is robust against the undesired objects.

As an alternative to determining the new agent position based on edge points, the new agent position may be based on a first number $N_1$ of data point of the point cloud data in a first direction along the intersecting line and a second number $N_2$ of data point of the point cloud data in a second direction along the intersecting line. The first and second direction may be the positive and negative direction, respectively. In other words, the current agent position partitions the intersection line in two parts. $N_1$ counts the number of data points of the point cloud data laying in one part of the intersection line and $N_2$ counts the number of data points of the point cloud data laying in the other part of the intersection line.

The new agent position may then be determined by adding the difference between $N_1$ and $N_2$, divided by a positive real-valued constant K, i.e. the distance $S_{dist}$ given by $$S_{dist} = (N_1 - N_2)/K,$$

to the current agent position with respect to the selected coordinate axis, such that the agent is moved in the first direction, if $N_1 > N_2$, the agent is moved in the second direction, if $N_1 < N_2$, and the agent is not moved if $N_1 = N_2$. The constant K may be set to a value larger than 1. The constant K may be set to a value less than 3. The constant K may preferably be set to 2.

In the above example, the new agent position $P_i(x_i, y_i)$ for a moving operation a direction parallel to the x-axis of the coordinate system relative to the bounding box may be given by $$x_i = x_{i-1} + (N_1 - N_2)/2 = x_{i-1} + S_{dist}$$

$$y_i = y_{i-1},$$

wherein $P_{i-1}(x_{i-1}, y_{i-1})$ is the current agent position, $N_1$ and $N_2$ are the number of pixels in the positive and negative x-direction, respectively, and the constant K is set to 2.

In the above example, the new agent position $P_i(x_i, y_i)$ for a moving operation a direction parallel to the y-axis of the coordinate system relative to the bounding box may be given by $$x_i = x_{i-1},$$

$$y_i = y_{i-1} + (N_1 - N_2)/2,$$

wherein $P_{i-1}(x_{i-1}, y_{i-1})$ is the current agent position, $N_1$ and $N_2$ are the number of pixels in the positive and negative y-direction, respectively, and the constant K is set to 2.

According to this alternative, the agent is allowed to temporarily leave the point cloud data. This approach may be used as a less computationally complex substitution of computing the center of gravity.

The fourth step S40 may be terminated in several ways. The number of agent moving operations may be predetermined, such as limited to three agent moving operation as in the above example described with respect to FIG. 3. Alternatively, the fourth step S40 may be determined to be completed if the distance between the current agent position and the new agent position is smaller than a threshold distance D, i.e.

$$|P_i - P_{i-1}| < D.$$

An advantage of the proposed agent moving operations is that computing consecutive agent positions requires only simple arithmetic operations, such as addition, subtraction, increment and shifting bits (when dividing by 2 or a power of two).

It should be noted that it is possible to use any combination of the above approaches for the agent moving operations in step S40 of performing a plurality of agent moving operations. In other words and with reference to the approaches described above, a first subset of the plurality of agent moving operations may be based on the first and second edge points being determined as the edge points of a connected line segment of a plurality of connected line segments closest to the current agent position, a second subset of the plurality of agent moving operations may be based on the first and second edge points being determined as the edge points of the largest connected line segment of a plurality of connected line segments, and a third subset of the plurality of agent moving operations are based on the difference between the first number and the second number, divided by a positive real-valued constant. The first agent moving operation performed in step S40 may be the agent moving operation based on the first number and the second number, divided by a positive real-valued constant.

In a fifth step S50, the new agent position, determined by the last agent moving operation of the previous fourth step S40, is determined as a central point of the point cloud data 2. The determined central point is included in the skeleton.

The central point of a point cloud data determined by this method 100 differs from the centroid, or center of gravity, of the point cloud data. FIGS. 4a to 4d illustrates point cloud data of different shapes, for which the central point is computed using two methods. The first method follows the conventional approach and is based on determining the center of gravity of the point cloud. The center of gravity is marked with a solid cross (✖). The second method is the proposed method 100 yielding a central point marked with a hollow plus symbol (✜). Depending on the shape of the point cloud data, the computed positions of the central point can substantially differ between these two approaches.

Figure 4A:
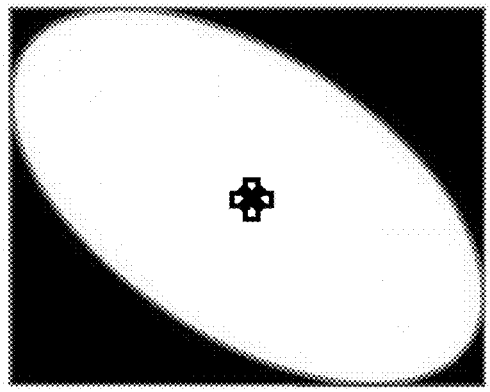
FIGS. 4a to 4d illustrates point cloud data of different shapes.
Figure 4B:
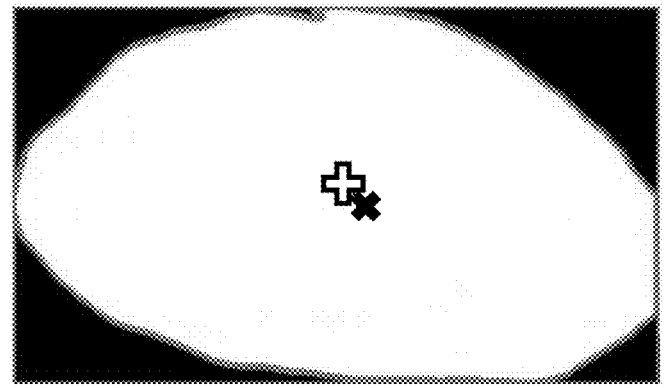

In FIGS. 4a and 4b point cloud data of regular shapes are shown, whose shape, to some extent, corresponds to car lights shown in FIGS. 1a to 1c. Here, the difference between the central point determined by the two approaches is relatively small.

Figure 4C:
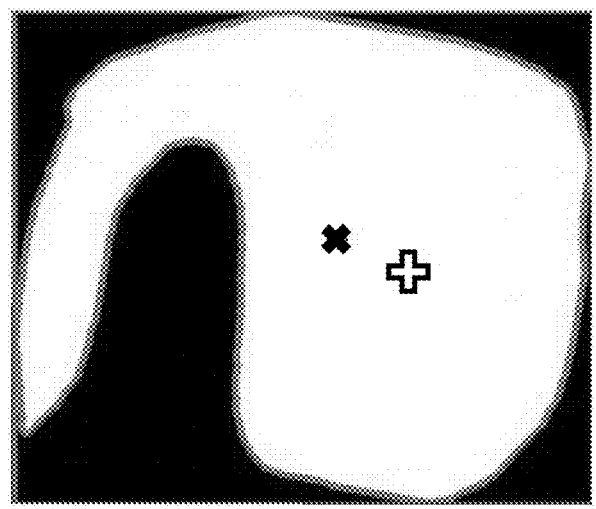

FIG. 4c shows a point cloud with an irregular shape, i.e. there is an undesired elongated segment on the left side which is connected with the main spot on the right side. As a result, the difference between the position of the center of gravity and the point determined with the use of the proposed method 100 is relatively large. As shown in FIG. 4c, the proposed method 100 is able to find the position of the central point of the main part of the spot, without taking into account the visible undesired segments.

Figure 4D:
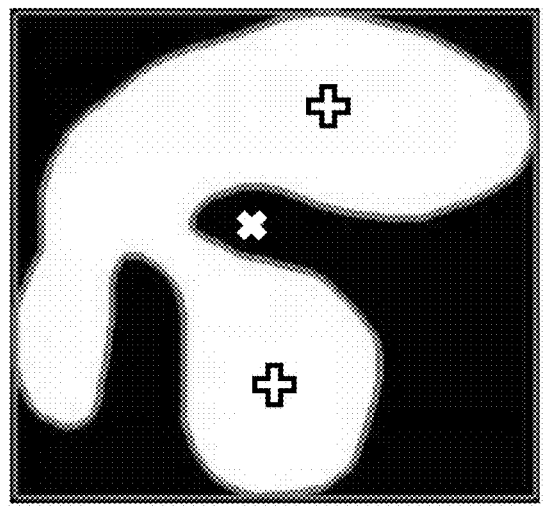

In FIG. 4d the point cloud data takes the shape of three spots which are connected with a bridge. When the center of gravity is computed, it is found to be outside the point cloud data. In case of the proposed method 100, the position of the central point may depend on the details of the particular embodiment of the proposed method. For example, the position of the central point may depend on the starting agent position, which may be chosen at random, the orientation of the coordinate system relative to the bounding box, the number of agent moving operations or the way the first and second edge points are selected. Two results for the central point according to embodiments of the proposed method are shown in FIG. 4d. The two central points are located in the center of the two largest segments of the point cloud data.

In a sixth step S60, the previous two steps S40 and S50 are repeated for each combination of the plurality of staring agent positions and the plurality of coordinate systems. This way a plurality of central points is determined. The plurality of central points is included in the skeleton of the point cloud data.

For example, in step S20, a plurality of A starting agent positions is selected, wherein A is a positive integer, and in step S30, a plurality of B coordinate systems is selected, wherein B is another positive integer. After performing a plurality of agent moving operations for one of the selected plurality of starting agent positions and one of the selected plurality of coordinate systems in step S40, the step S40 and S50 are repeated in step S60 for the remaining combinations of the plurality of staring agent positions and the plurality of coordinate systems. This way, after step S60 is completed, in total of A×B pluralities of agent moving operations have been performed resulting in a plurality of A×B central points included in the skeleton.

The resulting skeleton of the point cloud data may be used to classify the shape of the point cloud data as regular or irregular if the central points included in the skeleton are located close or not close, respectively, to each other. Here, "close" may be defined using a predetermined value, such as a radius. In this case, central points included in the skeleton are said to be close to each other if there is a sphere with a radius having the predetermined value such that all (or a predetermined percentage of) central points lie within that sphere, wherein the sphere has the same number of dimensions as the reference coordinate system. Alternatively, "close" may be defined using measures of the statistical dispersion of the plurality of central points included in the skeleton, such as the mean distance between central points, the standard deviation with respect to the mean of the central points, the interquartile range with respect to median of the central points or the like.

If the point cloud data features a regular convex shape, e.g. an oval or a rectangle, then the central points are located close to the center of gravity of the point cloud data or its main axis, with a relatively small dispersion. In case of irregular shape, e.g. point cloud data composed of a series of areas connected through "bridges", then the central points will focus close to a local centers of gravity of particular areas of the point cloud data. This conclusion is important, as based on this it is already possible to distinguish between regular and irregular objects.

Alternatively, the above-mentioned measures of the statistical dispersion may be computed with respect to a certain reference line for 2-dimensional point cloud data or for a certain reference plane for a 3-dimensional point cloud data. The reference line or plane may be an axis or plane of (approximate) symmetry of the point cloud data. An example for a reference line of point cloud data with a rectangular shape is shown in FIG. 5b. Here, the plurality of central points is scattered along an axis of symmetry of the rectangle.

FIGS. 5a to 7c illustrate point cloud data of different shapes, wherein the determined central points are each marked with a solid dot (•) and the center of gravity is marked with a solid cross (✖).

Figure 5A:
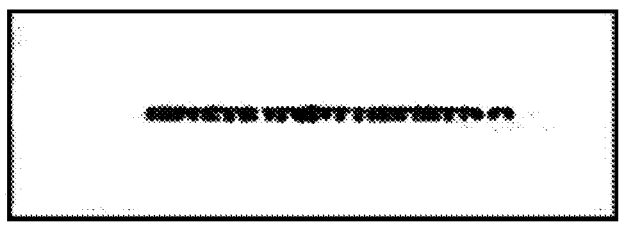
FIGS. 5a to 5c illustrates point cloud data of different shapes.
Figure 5B:
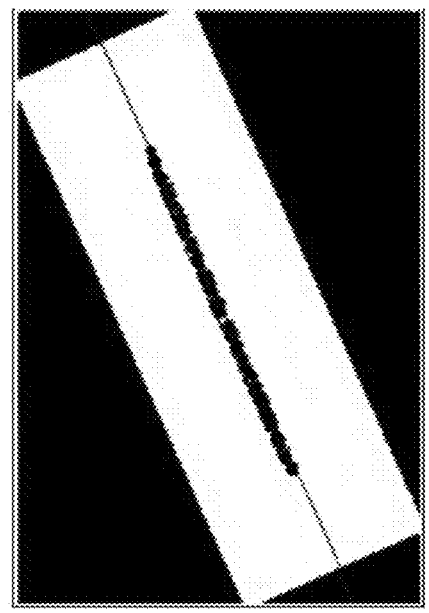
Figure 5C:
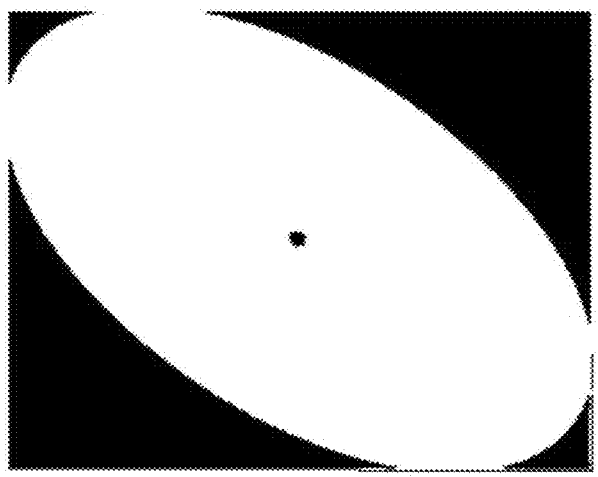

FIGS. 5a to 5c illustrate the process of building the skeleton for a point clouds with regular shapes, i.e. with shapes close to the convex ones. FIGS. 5a to 5b show the results for point cloud data with the shape of a rectangle rotated by different angles. The set of starting agent positions consists in this case of five points, four of which are near the corners of the bounding box and one is in the middle of the bounding box. The method 100 causes that the resulting central points are located on the longer axis of the rectangular point cloud data. A large concentration of these points around this axis is typical for objects with straight sides.

Figure 6A:
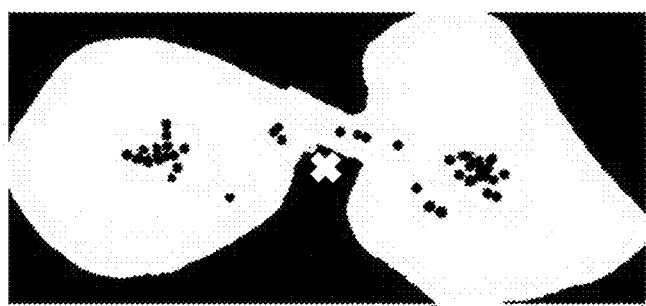
FIGS. 6a to 6c illustrates point cloud data of different shapes.
Figure 6B:
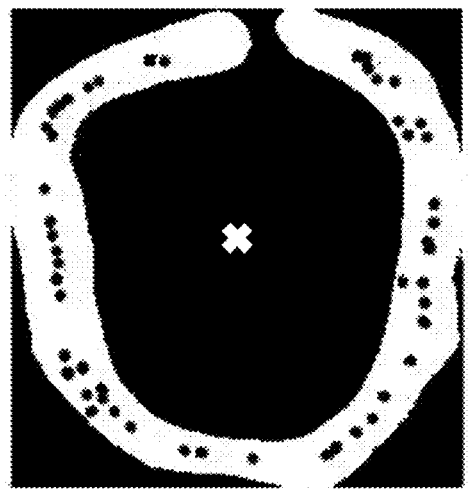
Figure 6C:
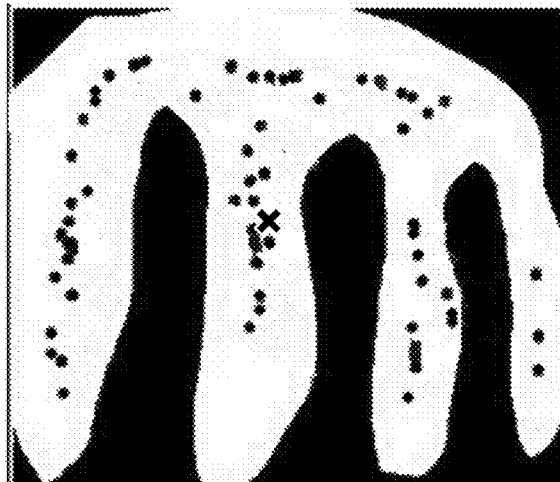

FIGS. 6a to 6c show point cloud data with irregular shapes. Particular examples have been selected to show some characteristic trends in the obtained results. FIGS. 6a to 6c show the case of joining together approximately regular segments. Using the arrangement of plurality of starting agent positions in the bounding box similar to the ones used in objects in FIGS. 5a to 5c, it can be seen that the central points are concentrated near the centers of particular segments of the object, as well as on the "bridges" connecting the segments. This principle is visible regardless of the angle of rotation of the object (compare FIGS. 6b and 6c).

It is a characteristic feature of point cloud data with irregular shapes discussed in the example above, compared to those with regular shapes, that for point cloud data with irregular shapes central points are concentrated in the vicinity of several separated segments. This allows for an easy distinguishing of point cloud data with either a regular or an irregular shape.

Figure 7A:
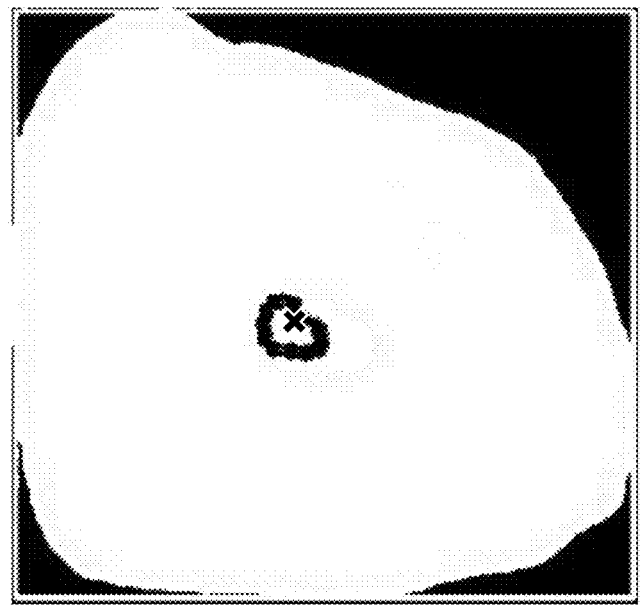
FIGS. 7a to 7c illustrates point cloud data of different shapes.
Figure 7B:
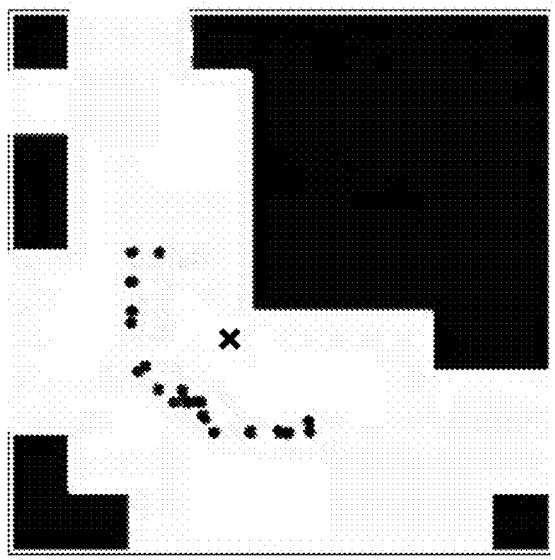
Figure 7C:
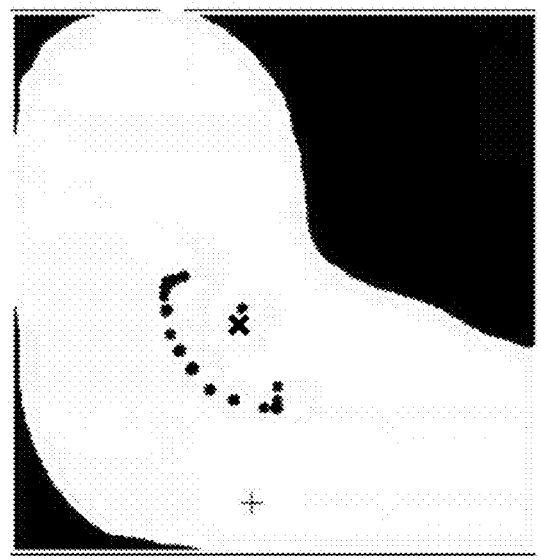

FIGS. 7a to 7c show a comparison of point cloud data with convex (FIG. 7a) and concave shapes (FIGS. 7b and 7c). In the first case, the central points are clustered near the center of gravity of the object, creating an image of a small closed ring around that center. In the second case, a skeleton is formed which is more spatially dispersed and additionally does not form a closed ring. FIGS. 7b and 7c are shown as an illustration that the algorithm is able to capture a general shape of the object and returning a similar arrangement of central points. A similar situation occurs in the cases shown in FIGS. 5a to 5c.

Clear trends can be seen when observing the results of the proposed method. When the point cloud data has a convex shape or a shape with slight concavities, similar to a circle or an oval, the output of the algorithm is a plurality of central points (skeleton) with a high concentration factor. When the point cloud data has a convex and elongated shape, then the resulting plurality of central points is scattered around a straight line. In the case of irregular shapes, composed of smaller segments joined with each other, the algorithm provides a plurality of central points concentrated around lines being the axes of symmetry of particular segments of the processed point cloud data.

In a seventh step (S70), a regression line is calculated by calculating a linear regression for the plurality of central points determined after step (S60) is completed. The orientation of the regression line with respect to the reference coordinate system is indicative of the orientation (rotation) of the target represented by the point cloud data.

In an eight step (S80), a rotation is performed based on the determined regression line. The subject of the rotation may either be plurality of central points or the point cloud data itself. The subject of the rotation is rotated in the reference coordinate system such that the regression line corresponds to a predetermined direction. The predetermined direction may, for example, be parallel (or even identical) to one of the coordinate axes of the reference coordinate system. The resulting rotated subject, i.e. the rotated plurality of central points or the rotated point cloud data, is, in both cases, referred to as the based form. Hence, only one of the sub-steps S81 and S82, described in the following, is performed in step S80.

In sub-step S81, the plurality of central points is rotated to a base form such that the regression line corresponds to a predetermined direction.

In step S82, the point cloud data is rotated to a base form such that the regression line corresponds to a predetermined direction, and repeating steps S10 to S60 for the base form to obtain a plurality of central points of the base form.

Compared to sub-step S82, sub-step S81 is computationally more efficient, as the number of central points is usually substantially smaller than the number of data points belonging to the point cloud data. Independent of which sub-step is performed, the result of step S80 is a plurality of central points of the base form. The plurality of central points of the base form may also be referred to as the skeleton of the base form.

In a ninth step S90, the shape descriptor is computed based on the plurality of central points of the base form, wherein the shape descriptor comprises the one or more inclination angles and information indicative of the stretch and compression of the base form of the point cloud data with respect to one or more axes of the reference coordinate system.

The one or more inclination angles correspond to the one or more angles of the regression line with respect to the coordinate axes of the reference coordinate system.

The information indicative of the stretch and compression of the base form may be given by at least one of a standard deviation, variance, skewness, mean value or a different normalized statistical measure of the plurality of central points of the base form.

The reason for rotating the original shape to its base form is to ensure that the results of the shape descriptor are always the same or at least very similar, independent of the orientation (rotation) of the point cloud, i.e. independent of the orientation (rotation) of the target represented by the point cloud. Point cloud data of the same shape should produce comparable and reproducible results, regardless of the inclination angle. This will also guarantee that the point cloud data with similar geometric features could be easily matched with each other which is essential, for example, in image classification tasks. Additionally, the inclination angle can also provide important information about a target and be helpful in distinguishing it from other targets.

The classification of the shape of the point cloud data may be based on the shape descriptor. For example, the shape may be classified as regular or irregular based on the information indicative of the stretch and compression of the base form.

Figure 8:
FIG. 8 illustrates point cloud data with a rectangular shape in the base form.
Figure 9A:
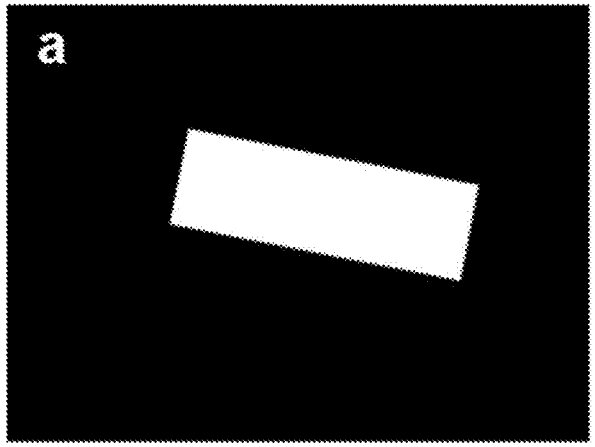
FIGS. 9a to 9d illustrates point cloud data with a rectangular shape and inclination angles of 11°, 22°, 33° and 66°, respectively.
Figure 9B:
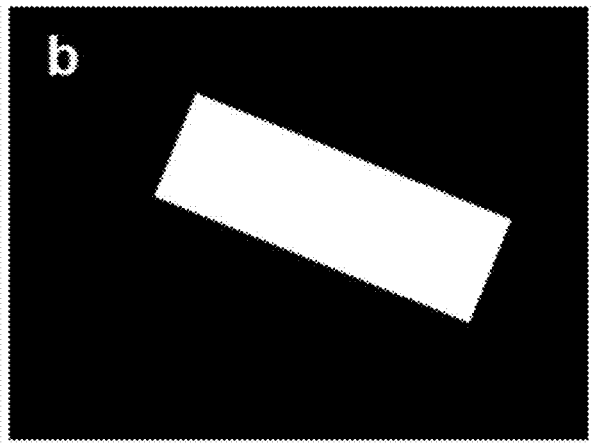
Figure 9C:
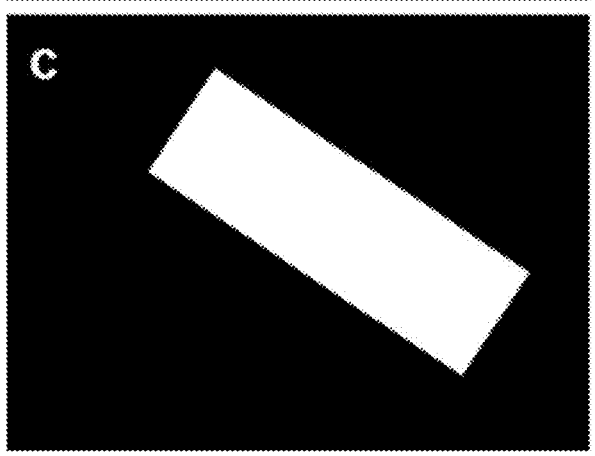
Figure 9D:
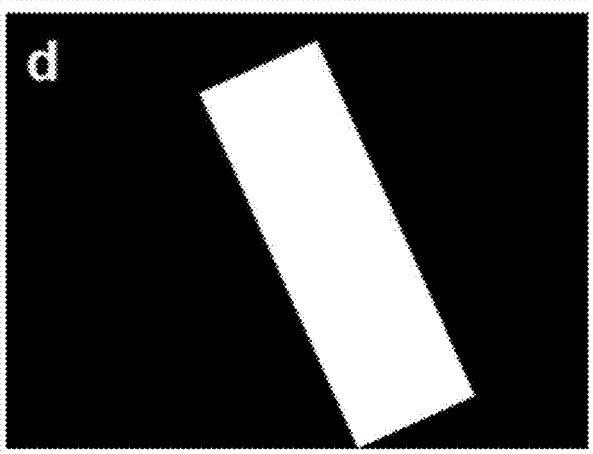

FIG. 8 shows an example for a point cloud data with a rectangular shape in the base form. Note that the point cloud data is not yet placed into a bounding box.

FIGS. 9a to 9d show the same rectangular point cloud data illustrated in FIG. 8, wherein the point cloud data is rotated by the angles 11°, 22°, 33° and 66°, respectively, with respect to the base form. Note that the point cloud data is not yet placed into a bounding box.

FIGS. 10a to 10d show the point cloud data corresponding to FIGS. 9a to 9d, respectively, placed in a bounding box. Furthermore, a plurality of central points, marked with a solid dot (•), according to the proposed method have been determined. In each of the FIGS. 10a to 10d, the plurality of central points (skeleton) are concentrated along the major axes of the rectangle, which (approximately) corresponds to the regression line. The regression line has been determined to have an inclination angle of 10.99° (FIG. 10a), 21.98° (FIG. 10b), 32.97° (FIG. 10c) and 65.93° (FIG. 10d), which (approximately) correspond to the real angles of rotation of 11° (FIG. 10a), 22° (FIG. 10b), 33° (FIG. 10c) and 66° (FIG. 10d). As can be seen from the computed values, the inclination angles successfully reproduce the angle of rotation. The precision may depend in the number of starting agent positions and the number of coordinate systems relative to the bounding box.

Figures 11A, 11B:
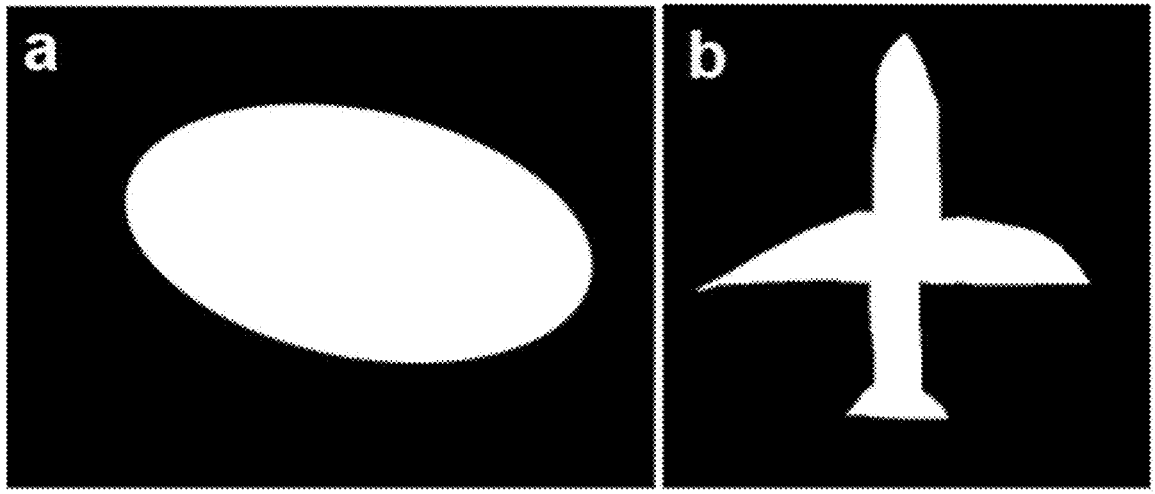
FIGS. 11a and 11b illustrates point cloud data of different shapes.

FIGS. 11a and 11b show examples for point cloud data with different shapes. The point cloud data illustrated in FIG. 11a has an oval shape, while the point cloud data illustrated in FIG. 11b has the shape of an airplane. Note that the point cloud data is not yet placed into a bounding box.

Figures 12A, 12B:
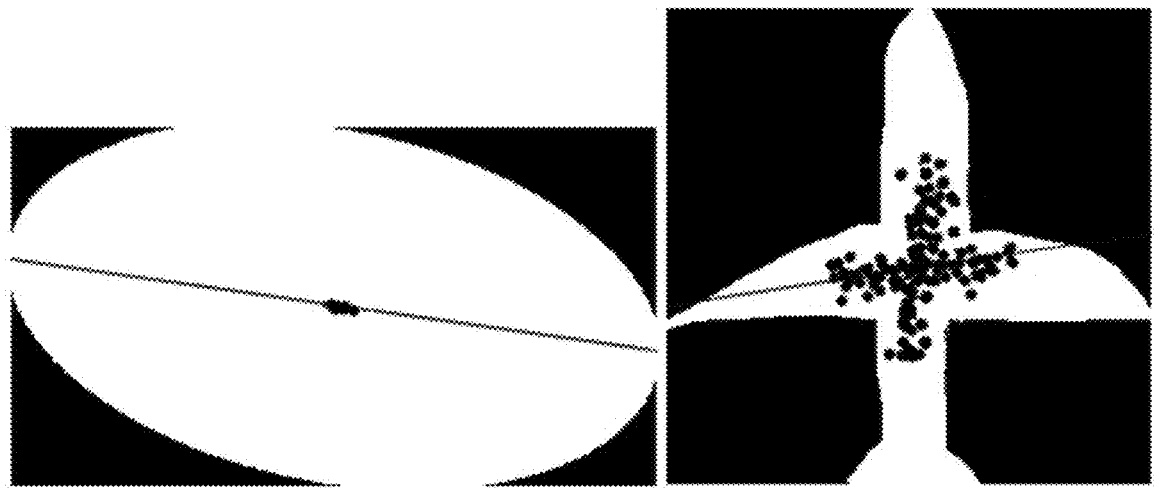
FIGS. 12a and 12b illustrates point cloud data of different shapes.

FIGS. 12a and 12b show the point cloud data corresponding to FIGS. 11a and 11b, respectively, placed in a bounding box. Furthermore, a plurality of central points, marked with a solid dot (•), according to the proposed method have been determined. In FIG. 12a the plurality of central points is concentrated close to the center of gravity (not shown) of the point cloud data indicating a regular shape, while in FIG. 12b the plurality of central points is aligned with the airplane's fuselage and wings indicating an irregular shape. The straight lines correspond to the computed regression lines.

It should be understood that the method 100 is not restricted to a 2-dimensional point cloud data. For example, the point cloud data may be 3-dimensional, such as, for example, a point cloud data generated by lidar sensors. In this case, the selected coordinate system is 3-dimensional with axes x, y and z and an agent moving operation parallel to any one of the axes would be performed similar to the above. For example, for the i-th agent moving operation parallel to the z-axis, the coordinates $x_i$, $y_i$ and $z_i$ of the new agent position $P_i(x_i, y_i, z_i)$ is then determined as the center point of the first and second edge point, $P_{pi}(x_{pi}, y_{pi}, z_{pi})$ and $P_{ki}(x_{ki}, y_{ki}, z_{ki})$, respectively, such that $x_i = x_{i-1}$, $y_i = y_{i-1}$, $z_i = z_{pi} + (z_{ki} - z_{pi})/2$.

This way the agent is moved from a current agent position $P_{i-1}(x_{i-1}, y_{i-1}, z_{i-1})$ in the positive or negative direction of the z-axis to the new agent position $P_i(x_i, y_i, z_i)$.

Similarly, the point cloud data may be N-dimensional. In this case, the selected coordinate system is N-dimensional with coordinate axes $x_1, \ldots, x_N$ and the fourth step S40 comprises moving the agent, for $i=1, \ldots, N$, from the current agent position to the new agent position in the positive or negative direction of the coordinate axis $x_i$.

As an alternative to determining the new agent position based as the center point of the first and second edge point, a different approach may be used. For example, distance between the first and second edge point may be divided by a positive value other than 2. If the point cloud data comprises non-binary data, such as grayscale image data or color image data, the center point may be determined using a weighted mean, wherein the weights are given by the grayscale or color values of the data points on the line connecting the first and second edge point.

Furthermore, the method 100 may comprise the additional step of repeating steps S10 to S60 for point cloud data representing a target at different points in time thereby determining a plurality of skeletons, the plurality of skeletons providing information indicative of a time-evolution of the target.

Furthermore, the method 100 may comprise the additional step of executing, after step S60, a predetermined operation of the vehicle based on the determined shape descriptor of the point cloud data, wherein the predetermined operation comprises adaptive headlight control, traffic sign recognition, automatic emergency breaking and/or object tracking.

Figure 13:
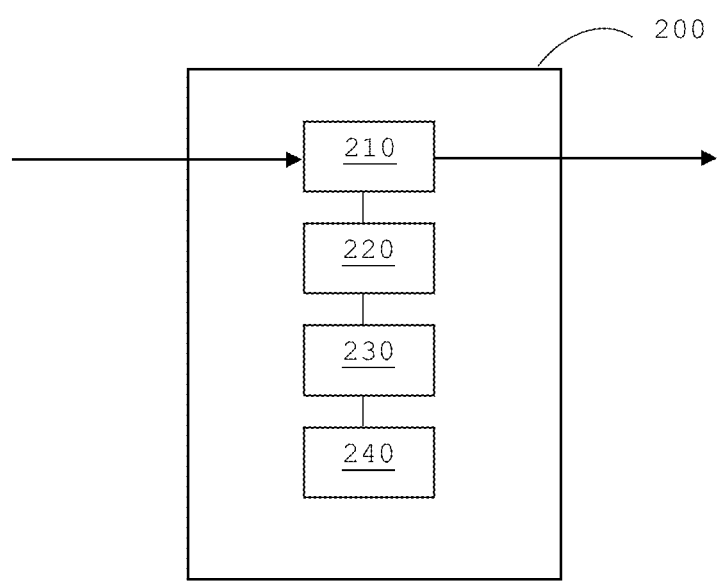
FIG. 13 is a schematic illustration of a hardware structure of a data processing apparatus.

FIG. 13 is a schematic illustration of a hardware structure of a data processing apparatus comprising means for carrying out the steps of the methods of any of the embodiments disclosed above.

The data processing apparatus 200 has an interface module 210 providing means for transmitting and receiving information. The data processing apparatus 200 has also a processor 220 (e.g. a CPU) for controlling the data processing apparatus 200 and for, for instance, process executing the steps of the methods of any of the embodiments disclosed above. It also has a working memory 230 (e.g. a random-access memory) and an instruction storage 240 storing a computer program having computer-readable instructions which, when executed by the processor 220, cause the processor 220 to perform the methods of any of the embodiments disclosed above.

The instruction storage 240 may include a ROM (e.g. in the form of an electrically erasable programmable read-only memory (EEPROM) or flash memory) which is pre-loaded with the computer-readable instructions. Alternatively, the instruction storage 240 may include a RAM or similar type of memory, and the computer-readable instructions can be input thereto from a computer program product, such as a computer-readable storage medium such as a CD-ROM, etc.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present disclosure have been described above, it should be understood that they have been presented by way of example, and not limitation. It will be apparent to persons skilled in the relevant art(s) that various changes in form and detail can be made therein. Thus, the above described example embodiments are not limiting.

The invention claimed is:

1. A computer-implemented method for determining a shape descriptor of point cloud data in an automotive system for monitoring the environment of a vehicle, the shape descriptor being indicative of the shape of the point cloud data, the point cloud data being generated by one or more sensors of the vehicle with respect to a reference coordinate system, the point cloud data defining a connected subspace of the reference coordinate system, the method comprising the steps:
   a) determining (S10) a bounding box of the point cloud data;
   b) selecting (S20) a plurality of starting agent positions of an agent within the bounding box;
   c) selecting (S30) a plurality of coordinate systems relative to the bounding box;
   d) performing (S40), for one of the selected plurality of starting agent positions and one of the selected plurality of coordinate systems, a plurality of agent moving operations, wherein each agent moving operation comprises moving the agent from the current agent position to a new agent position parallel to a coordinate axis of the selected coordinate system, wherein the new agent position is determined based on an intersecting line through the current agent position parallel to the coordinate axis;
   e) determining, after step d) is completed, the new agent position as a central point of the point cloud data;
   f) repeating (S60) steps d) and e) for each combination of the plurality of staring agent positions and the plurality of coordinate systems, thereby determining a plurality of central points of the point cloud data;
   g) determining (S70) a regression line by calculating a linear regression for the plurality of central points;
   h) performing (S80) one of the following steps h1) and h2):
      h1) rotating (S81) the plurality of central points to a base form such that the regression line corresponds to a predetermined direction; or
      h2) rotating (S82) the point cloud data to a base form such that the regression line corresponds to a predetermined direction, and repeating steps a) to f) for the base form to obtain a plurality of central points of the base form;
   i) computing (S90) the shape descriptor based on the plurality of central points of the base form, wherein the shape descriptor comprises the one or more inclination angles and information indicative of the stretch and compression of the base form of the point cloud data with respect to one or more axis of the reference coordinate system.

2. The method according to claim 1, wherein the plurality of starting agent positions is selected at random positions within the bounding box or at predetermined positions within the bounding box.

3. The method according to claim 2, wherein the information indicative of the stretch and compression of the base form is given by at least one of a standard deviation, variance, skewness and mean value.

4. The method according to any one of the previous claims, wherein
   the reference coordinate system and the coordinate systems relative to the bounding box are orthogonal.

5. The method according to claim 4, wherein
   the reference coordinate system and the coordinate systems relative to the bounding box are 2-dimensional, and step c) comprises selecting a rotation angle defining the rotation of the reference coordinate system with respect to a coordinate system.

6. The method according to any one of the previous claims, wherein,
the new agent position is determined based on edge points given by the intersections of an intersecting line through the current agent position parallel to the coordinate axis with the boundary of the subspace defined by the point cloud data.

7. The method according to any one of the previous claims, wherein
the new agent position is determined based on a first and a second edge point of the edge points, and
the first and second edge points are determined as the edge points of a connected line segment of a plurality of connected line segments closest to the current agent position or the first and second edge points are determined as the edge points of the largest connected line segment of a plurality of connected line segments, wherein each connected segment of the plurality of connected line segments is defined as a range where the intersecting line intersects the connected subspace, and
the new agent position is preferably determined as the center point of the first and second edge point.

8. The method according to any one of claims 1 to 4, wherein
the new agent position is determined based on adding the difference between a first number and a second number, divided by a positive real-valued constant, to the current agent position with respect to the coordinate axis, wherein the first number is a number of data points of the point cloud data in a first direction along the intersecting line and the second number is a number of data points of the point cloud data in a second direction along the intersecting line.

9. The method according to any one of the previous claims, wherein
the selected coordinate system is N-dimensional with coordinate axes $x_1, \ldots, x_N$, and
step d) comprises moving the agent, for $i=1, \ldots, N$, from the current agent position to the new agent position in the positive or negative direction of the coordinate axis $x_i$.

10. The method according to any one of the previous claims, wherein
the number of agent moving operations is predetermined, or
step d) is completed if the distance between the current agent position and the new agent position is smaller than a threshold distance.

11. The method according to any one of the previous claims, further comprising the steps of
classifying the shape of the point cloud data as regular or irregular based on the shape descriptor.

12. The method according to claim 11, wherein
the one or more sensors of the vehicle comprise cameras, photosensors, infrared sensors, lidar sensors, radar sensors and/or ultrasonic sensors.

13. The method according to any one of the previous claims, further comprising the step of
executing, after step i), a predetermined operation of the vehicle based on the determined shape descriptor of the point cloud data,
wherein the predetermined operation comprises adaptive headlight control, traffic sign recognition, automatic emergency breaking and/or object tracking.

14. A data processing apparatus comprising means for carrying out the steps of the method of any one of the previous claims.

15. A vehicle comprising the data processing apparatus according to claim 14.

* * * * *